United States Patent
Gafni et al.

(10) Patent No.: US 11,991,159 B2
(45) Date of Patent: May 21, 2024

(54) BI-DIRECTIONAL ENCRYPTION/DECRYPTION DEVICE FOR UNDERLAY AND OVERLAY OPERATIONS

(71) Applicant: Mellanox Technologies, Ltd., Yokneam (IL)

(72) Inventors: Barak Gafni, Sunnyvale, CA (US); Liron Mula, Hertzlia (IL)

(73) Assignee: Mellanox Technologies, Ltd., Yokneam (IL)

( * ) Notice: Subject to any disclaimer, the term of this patent is extended or adjusted under 35 U.S.C. 154(b) by 307 days.

(21) Appl. No.: 17/568,582

(22) Filed: Jan. 4, 2022

(65) Prior Publication Data

US 2023/0216837 A1 Jul. 6, 2023

(51) Int. Cl.
*H04L 9/40* (2022.01)
*H04L 12/46* (2006.01)

(52) U.S. Cl.
CPC ........ *H04L 63/0485* (2013.01); *H04L 63/162* (2013.01); *H04L 63/164* (2013.01); *H04L 12/4633* (2013.01); *H04L 63/0428* (2013.01)

(58) Field of Classification Search
CPC . H04L 63/0428; H04L 12/4633; H04L 69/22; H04L 63/20; H04L 63/164; H04L 63/0485; H04L 63/162
See application file for complete search history.

(56) References Cited

U.S. PATENT DOCUMENTS

| | | | | |
|---|---|---|---|---|
| 2004/0139313 A1* | 7/2004 | Buer | ........................ | H04L 9/40 713/150 |
| 2004/0255037 A1* | 12/2004 | Corvari | ................. | H04L 9/3263 709/201 |
| 2017/0083401 A1* | 3/2017 | Ryu | ..................... | G11C 11/1677 |
| 2017/0124998 A1* | 5/2017 | Ishibashi | ................ | G10H 1/183 |
| 2019/0052567 A1* | 2/2019 | Muntz | ..................... | H04L 69/16 |

FOREIGN PATENT DOCUMENTS

CN 110636078 A * 12/2019 ......... H04L 12/4641

OTHER PUBLICATIONS

K.-Y. Yuan, J. Chen, G.-P. Liu and J. Sun, "Design and implementation of data encryption for networked control systems," 2009 IEEE International Conference on Systems, Man and Cybernetics, San Antonio, TX, USA, 2009, pp. 2105-2109 (Year: 2009).*

* cited by examiner

*Primary Examiner* — Farid Homayounmehr
*Assistant Examiner* — Zhimei Zhu
(74) *Attorney, Agent, or Firm* — Lowenstein Sandler LLP

(57) ABSTRACT

Technologies for bi-directional encryption and decryption for underlay and overlay operations are described. One network device includes multiple ports, a network processing element, a programmable path-selection circuit, and a security IC. The programmable path-selection circuit is configured to operate in a first mode in which first outgoing packets are routed to the security integrated circuit to be encrypted before sending on one of the ports, and first incoming packets, received on one of the ports, are routed to the security integrated circuit to be decrypted. The programmable path-selection circuit is configured to operate in a second mode in which second incoming packets are routed to the security integrated circuit to be encrypted before processing by the network processing element and route second outgoing packets to the security integrated circuit to be decrypted after processing by the network processing element.

19 Claims, 9 Drawing Sheets

BI-DIRECTIONAL ENCRYPTION/DECRYPTION DEVICE FOR UNDERLAY AND OVERLAY OPERATIONS

TECHNICAL FIELD

At least one embodiment pertains to processing resources used to perform and facilitate network communication. For example, at least one embodiment pertains to bi-directional encryption/decryption technology for underlay and overlay operations.

BACKGROUND

Network devices (e.g., switches, routers, hubs, end-points, network interface cards (NICs), data processing units (DPUs), and the like) can have encryption/decryption capabilities (e.g., media access control security (MACsec) or Internet Protocol security (IPsec)) to encrypt/decrypt starting at a relevant layer of a networking stack, such as the Layer 2 (L2) or Layer 3 (L3). These encryption/decryption capabilities can be used as an example when devices are connected point-to-point through an optical cable or when there are switches in the middle for L2 encryption and routers in the middle for L3 encryption.

Overlay networking can be used to create layers of network abstraction that can be used to run multiple separate, discrete virtualized network layers on top of a physical network. Overlay networking uses overlay encapsulation protocols. Overlay encapsulation protocols can create a virtual network overlaid on top of an existing physical network infrastructure. It uses the underlay IP network and builds a flexible layer 2 overlay logical network on it. With the overlay, any connection running over layer 2 can span across a layer 3 network.

Using both encryption/decryption capabilities with overlay network technologies can create some challenges. For example, MACsec/IPsec capable devices cannot support cases where there is a need for carrying overlay traffic while assuming the underlay devices should be able to natively route the traffic using L3 routing, including reading L4 headers when needed.

BRIEF DESCRIPTION OF DRAWINGS

Various embodiments in accordance with the present disclosure will be described with reference to the drawings, in which.

DETAILED DESCRIPTION

Figure 1A:
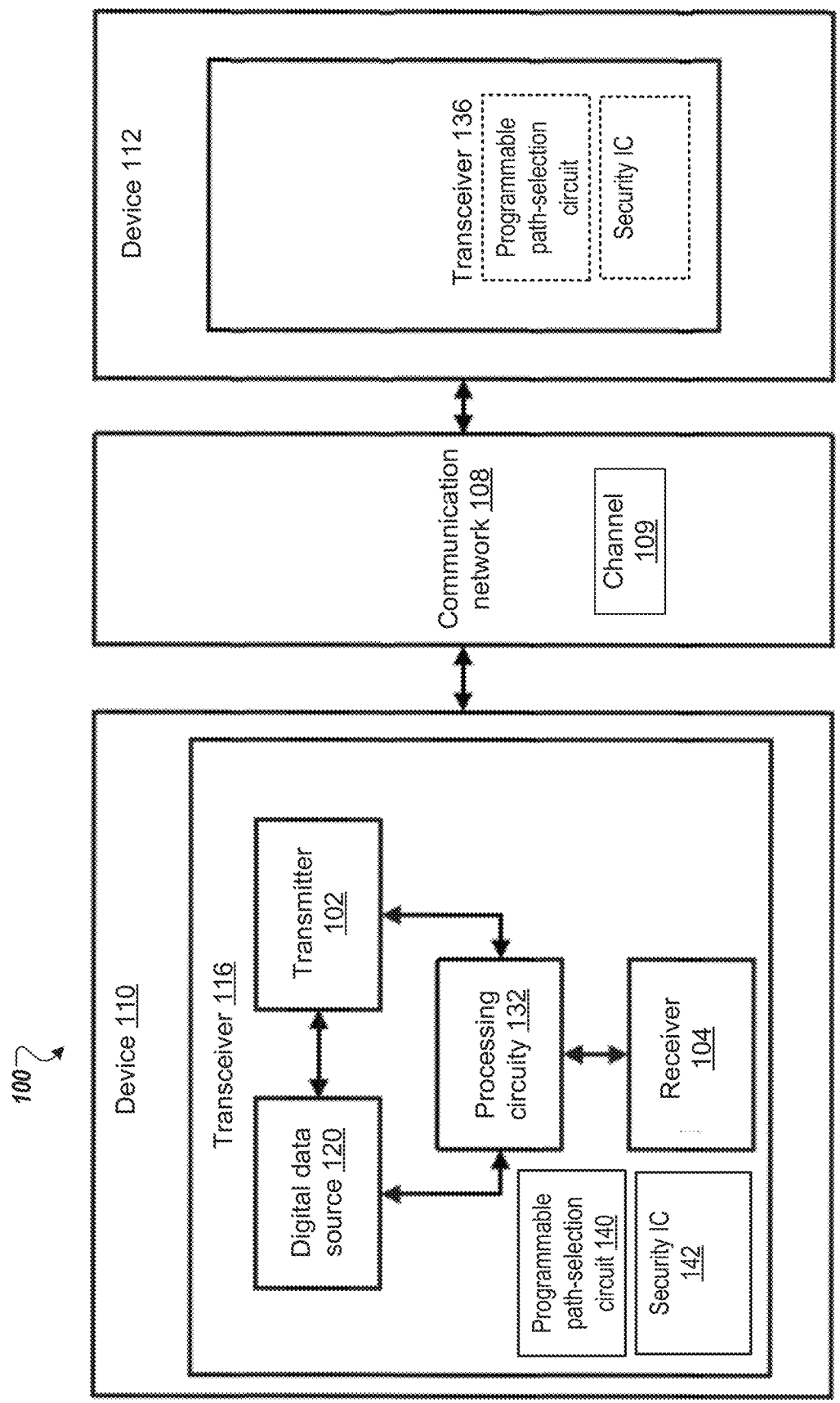
FIG. 1A illustrates an example communication system, in accordance with at least some embodiments.

Technologies for bi-directional encryption and decryption for underlay and overlay operations are described. Media access control security (MACsec) capability (e.g., in the form of circuitry, integrated chips (ICs), and devices) has been added to many network devices (or circuits) in order to provide end-to-end network security in different types of networks. For example, MACsec is a network security standard that operates at the medium access control layer and defines data confidentiality and integrity for media access independent protocols. Thus, MACsec can provide point-to-point security on Ethernet links (generally referred to as network links herein), and be defined by the Institute of Electrical and Electronics Engineers (IEEE) standard 802.11AE. Further, MACsec can be used in combination with other security protocols, such as Internet Protocol Security (IPsec) and Secure Sockets Layer (SSL) to provide this end-to-end network security.

MACsec can identify and prevent most security threats, including denial of service, intrusion, man-in-the-middle, masquerading, passive wiretapping, and playback attacks. To do so, MACsec secures an Ethernet link for almost all traffic, including frames from the Link Layer Discovery Protocol (LLDP), Link Aggregation Control Protocol (LACP), Dynamic Host Configuration Protocol (DHCP), Address Resolution Protocol (ARP), and other protocols that are not typically secured on an Ethernet link because of limitations with other security solutions. Thus, MACsec circuitry is expected to grow with the expansion of the Internet of Things (IoT) and other network-enabled devices. One of the primary use cases for MACsec is to secure a local area network (LAN) with multiple machines, and in particular to secure traffic over Ethernet on Layer 2 LAN networks. In order to implement MACsec functionality between a switch and connected end-points (such as PC clients, IoT devices, and the like), devices can use a standardized negotiation protocol called MACsec Key Agreement (IEEE 802.1X-2010).

While MACsec circuitry can be integrated within a network device (e.g., be coupled to a network circuit within the network device), there are advantages to keeping the MACsec circuitry separate from the network device. For example, MACsec circuitry is specialized, can be efficiently manufactured separately as an IC or a MACsec device, and some legacy network devices may not already include MACsec circuitry. In these embodiments, a MACsec circuit or device (referred to generally hereafter as "device") can be coupled between the network device and a network connection source or other network devices. As a result, each MACsec device provides end-to-end security for the network device to which the MACsec device is coupled and the network devices need not be redesigned or remanufactured to include MACsec circuitry.

As described above, using both encryption/decryption capabilities with overlay network technologies can create some challenges. For example, MACsec/IPsec capable devices cannot support cases where there is a need for carrying overlay traffic while assuming the underlay devices should be able to natively route the traffic using L3 routing, including reading L4 headers when needed.

Aspects and embodiments of the present disclosure address these and other challenges by providing bi-directional encryption/decryption for underlay and overlay operations. Aspects and embodiments of the present disclosure can provide a programmable path-selection circuit for different modes of operation. The network device can operate in two modes and implement standard cryptographic operations for native and overlay networks while having the flexibility of operating in both modes using the programmable path-selection circuit. The programmable path-selection circuit is coupled to a security IC (e.g., MACsec device or IPsec IC device). The programmable path-selection circuit can change the connectivity within the cryptographic device or outside the cryptographic device to provide more flexibility. The programmable path-selection circuit enables both sides of the cryptographic device to go either to encryption or decryption, allowing clear incoming data to be encrypted ahead of being processed by the network processing element.

FIG. 1A illustrates an example communication system 100 according to at least one example embodiment. The system 100 includes a device 110, a communication network 108 including a communication channel 109, and a device 112. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a graphics processing unit (GPU), a switch (e.g., a high-speed network switch), a network adapter, a central processing unit (CPU), etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. Additional details of the structure of the transmitter 102 are discussed in more detail below with reference to the figures.

The receiver 104 of device 110 (and device 112) may include suitable hardware and/or software for receiving signals, for example, data signals from the communication network 108. For example, the receiver 104 may include components for receiving processing signals to extract the data for storing in a memory.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory).

The processing circuitry 132 may send and/or receive signals to and/or from other elements of the transceiver 116 to control the overall operation of the transceiver 116. Additionally or alternatively, the processing circuitry 132 may comprise hardware, such as an application specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

In at least one embodiment, the devices 110 and 112 each include a MACsec device. Communication can flow in both directions between the devices 110 and 112, where the first MACsec devices are intermediate network devices used to secure communication between the devices 110 and 112. The communication network 108 can further include a network link (whether wired or wireless) between the MACsec devices, which can be over a relatively large distance in some embodiments. Network links can typically be implemented with twisted-pair cable or optical fiber cable.

The device 110 is a network device, such as a switch, which includes multiple ports and a network processing element (e.g., the processing circuitry 132). As described herein, the device 110 can operate in two modes and can implement standard cryptographic operations for native and overlay networks while having the flexibility of operating in both modes using a programmable path-selection circuit 140 coupled to a security IC 142 (e.g., MACsec device or IPsec IC device). The programmable path-selection circuit 140 can change the connectivity within the cryptographic device or outside the cryptographic device to provide more flexibility. The programmable path-selection circuit 140 enables both sides of the cryptographic device to go either to encryption or decryption, allowing clear incoming data to be encrypted ahead of being processed by the network processing element. Additional details of the programmable path-selection circuit 140 and the security IC 142 are described below with respect to FIG. 1B.

Figure 1B:
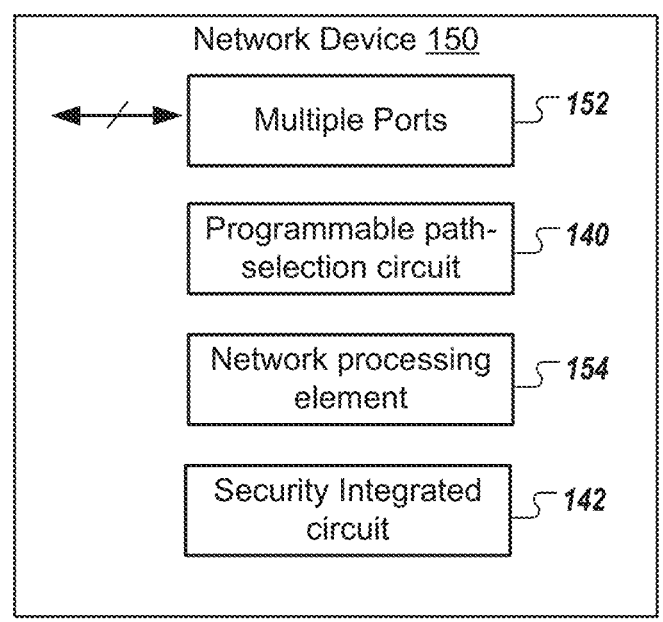
FIG. 1B is a block diagram of a network device, in accordance with at least some embodiments.

FIG. 1B is a block diagram of a network device 150 in accordance with at least some embodiments. The network device 150 includes multiple ports 152, a network processing element 154, such as a switch ASIC (similar to processing circuitry 132 described above), a programmable path-selection circuit 140, and a security IC 142 (e.g., MACsec device or IPsec IC device). In at least one embodiment, the programmable path-selection circuit 140 is configured to operate in a first mode or a second mode. In the first mode, the programmable path-selection circuit 140 routes first outgoing packets to the security IC 142 to be encrypted before sending on one of the multiple ports 152. Also, in the first mode, the programmable path-selection circuit 140 routes first incoming packets, received on one of the multiple ports 152, to the security IC 142 to be decrypted. In the second mode, the programmable path-selection circuit 140 routes second incoming packets to the security IC 142 to be encrypted before processing by the network processing element 154.

In a further embodiment, in the second mode, the programmable path-selection circuit 140 routes second outgoing packets to the security IC 142 to be decrypted after by the network processing element 154.

In another embodiment, in the first mode, the programmable path-selection circuit 140 routes a first outgoing packet to the security IC 142 to obtain an encrypted packet. The programmable path-selection circuit 140 sends the encrypted packet on a first port of the multiple ports 152. In at least one embodiment, the first port is a protected port. In a further embodiment, in the first mode, the programmable path-selection circuit 140 receives a first incoming packet on a second port of the multiple ports 152. In at least one embodiment, the second port is a protected port. The programmable path-selection circuit 140 routes the first incoming packet to the security IC 142 to obtain a decrypted packet and routes the decrypted packet to the network processing element 154.

In at least one embodiment, in the second mode, the programmable path-selection circuit 140 receives a first incoming packet on a first port of the multiple ports 152 and routes a first outgoing packet to the security IC 142 to obtain an encrypted packet. The programmable path-selection circuit 140 routes the encrypted packet to the network processing element 154 to obtain an encapsulated packet. The encapsulated packet is sent on a second port of the multiple ports 152. The second port can be a protected port.

In at least one embodiment, in the second mode, the programmable path-selection circuit 140 routes a first outgoing packet to the security IC 142 to obtain a decrypted packet and send the decrypted packet on a second port of the multiple ports 152. In at least one embodiment, the second port is a non-protected port.

Figure 2A:
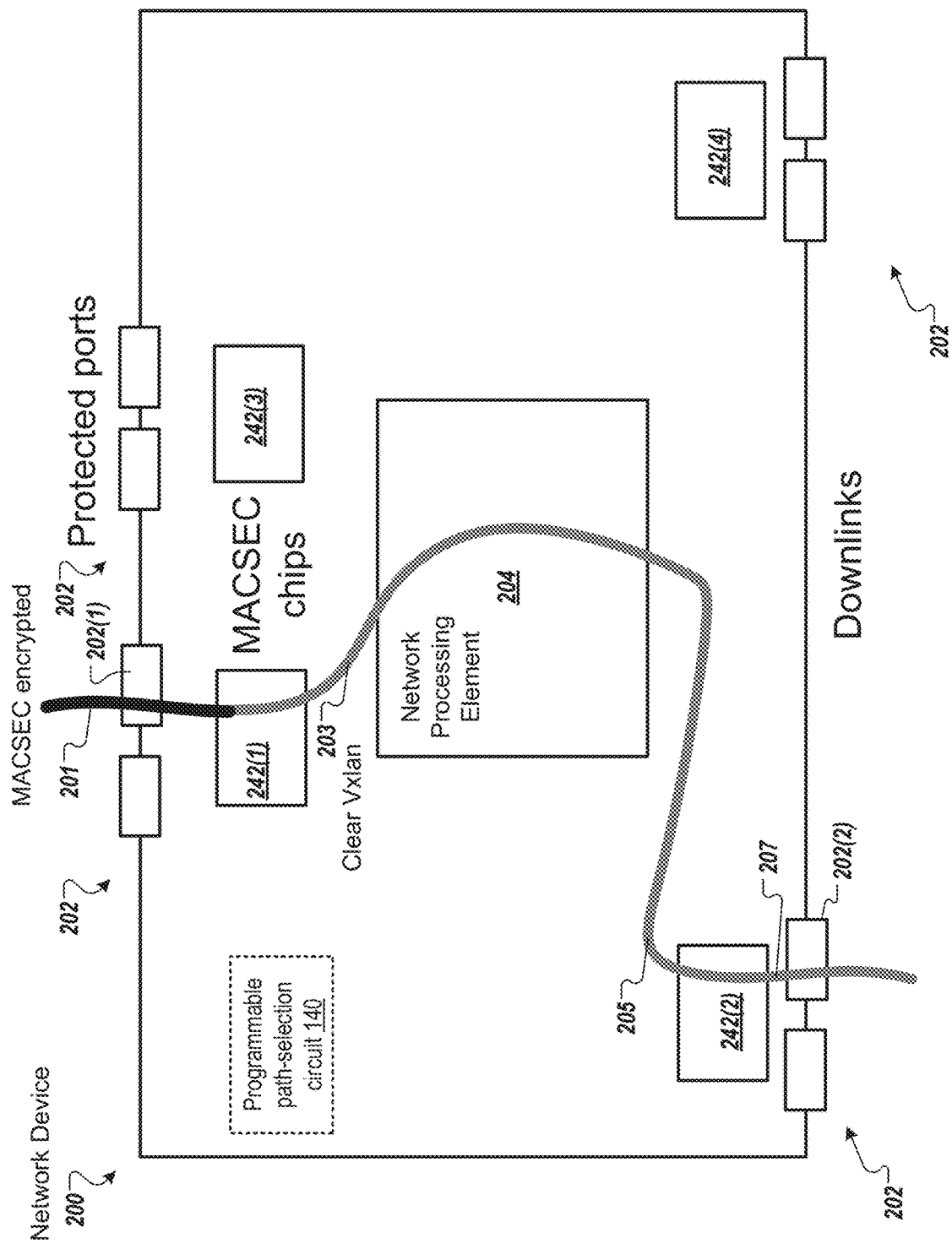
FIG. 2A is a block diagram of a network device with the programmable path-selection circuit to operate in a first mode, in accordance with at least some embodiments.
Figure 2B:
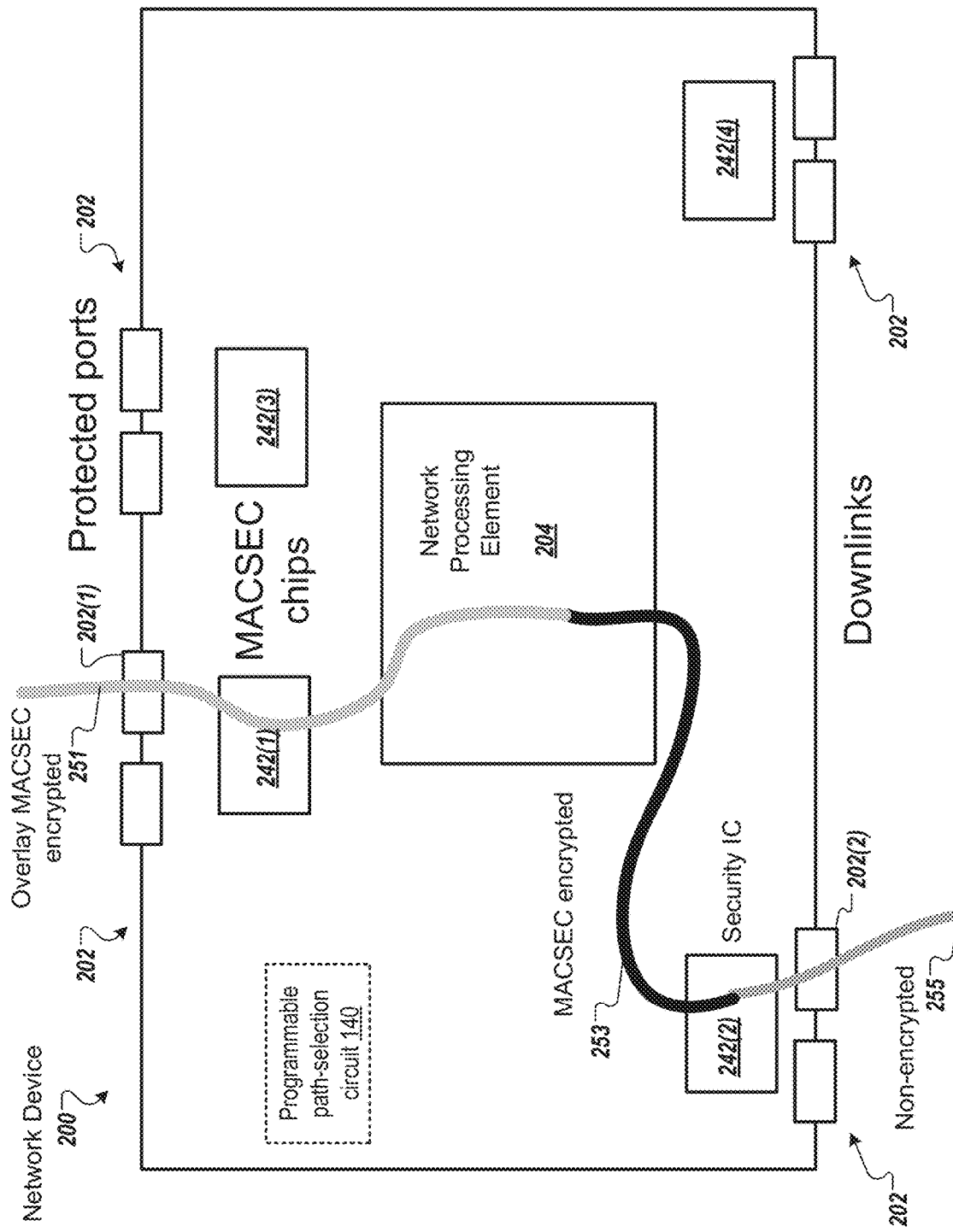
FIG. 2B is a block diagram of the network device with the programmable path-selection circuit to operate in a second mode, in accordance with at least some embodiments.

As described above, the programmable path-selection circuit 140 can be coupled to the security IC 142 and provide routing to the security IC 142 in two modes, such as illustrated and described in the example paths of FIGS. 2A-2B.

FIG. 2A is a block diagram of a network device 200 with the programmable path-selection circuit 140 to operate in a first mode, in accordance with at least some embodiments. The network device 200 includes a set of ports 202, a set of security ICs 242 (also referred to as cryptographic circuits), and a network processing element 204. During operation in the first mode, the network device 200 receives first incoming packets 201 on a first port 202(1). In one embodiment, the first incoming packets 201 include MACsec encrypted packets. The programmable path-selection circuit 140 routes the first incoming packets 201 to a first security IC 242(1) to be decrypted. After the first incoming packets 201 are decrypted by the first security IC 242(1), the programmable path-selection circuit 140 routes the decrypted packets 203 to the network processing element 204. The decrypted packets 203 can be clear Vxlan packets. Alternatively, the decrypted packets 230 may not be encapsulated. The network processing element 204 can process the Vxlan packets. For example, the network processing element 204 can determine where to route the packets, whether to encapsulate or de-encapsulate the packets, or the like. The network processing element 204 can send outgoing packets 205 to a second port 202(2). In at least one embodiment, the programmable path-selection circuit 140 can route the outgoing packets 205 to a second security IC 242(3) to be encrypted as encrypted packets 207 before sending via the second port 202(2). The encrypted packets 207 are sent out on the second port 202(2). In at least one embodiment, the first port 202(1) and the second port 202(2) are protected ports. In another embodiment, the first port 202(1) is a protected port and the second port 202(2) is not a protected port, and the outgoing packets are not encrypted.

FIG. 2B is a block diagram of the network device 200 with the programmable path-selection circuit 140 to operate in a second mode, in accordance with at least some embodiments.

During operation in the second mode, the network device 200 receives first incoming packets 251 on the first port 202(1). In one embodiment, the first incoming packets 251 include overlay MACsec encrypted packets. The programmable path-selection circuit 140 routes the first incoming packets 251 to the network processing element 204 to be processed (e.g., de-encapsulated) instead of being decrypted by the first security IC 242(1). This may need to be done in order to enable the security IC 242(2) to decrypt the packet. The network processing element 204 can process the overlay information in the first incoming packets 251 to obtain outgoing packets 253. It should be noted that the network processing element 204 can process the underlay and only the MAC header from the overlay information. This is because the rest of the overlay header is still encrypted in this case. The outgoing packets 253 can include MACsec encrypted packets. The programmable path-selection circuit 140 can route the outgoing packets 253 to a second security IC 242(2) to be decrypted to obtain decrypted packets 255 before sending via the second port 202(2). The decrypted packets 255 are sent out on the second port 202(2). In at least one embodiment, the first port 202(1) is a protected port and the second port 202(2) is a non-protected port.

In another embodiment, the network device 200 can receive incoming packets on a non-protected port. The programmable path-selection circuit 140 can route the incoming packets to a security IC to be encrypted before being processed by the network processing element 204. The network processing element 204 can add overlay or underlay information to the packet and send the outgoing packets as overlay encrypted packets in which another receiving device can process the overlay information before decrypting the packets as described above with respect to FIG. 2B. As described above, the network processing element 204 can process the underlay and part of the overlay that is not encrypted.

The programmable path-selection circuit 140 can be used to allow the network processing element 204 to process overlay or underlay information in the packets. The programmable path-selection circuit 140 provides flexibility in routing incoming and outgoing packets to the cryptographic circuits in either direction based on the mode, such as illustrated in FIGS. 3A-3B.

Figure 3A:
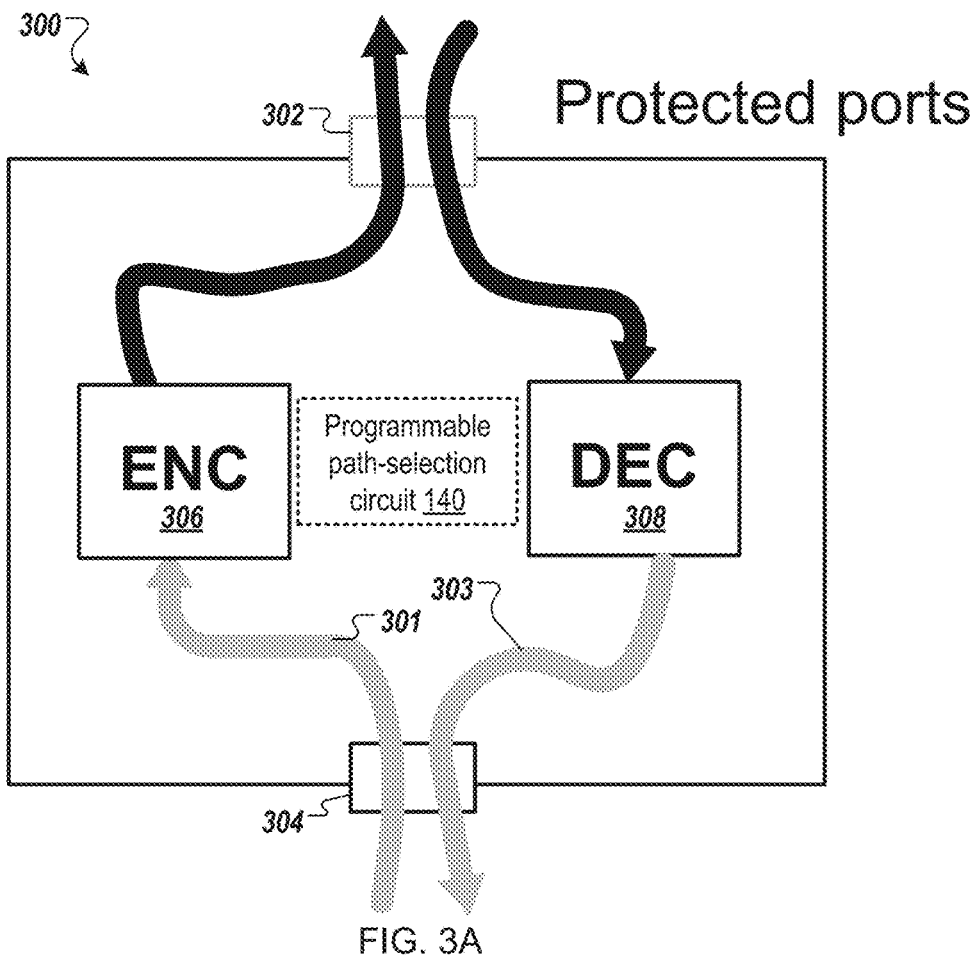
FIG. 3A is a block diagram of a network device with paths through an encryption circuit and a decryption circuit in a first mode, in accordance with at least some embodiments.

FIG. 3A is a block diagram of a network device 300 with paths through an encryption circuit and a decryption circuit in a first mode, in accordance with at least some embodiments. The network device 300 includes a first port 302, a second port 304, an encryption circuit 306, and a decryption circuit 308. The programmable path-selection circuit 140 provides paths between the first port 302 and the second port 304 through the encryption circuit 306 and decryption circuit 308 in a first mode. In the first mode, the second port 304 receives a first packet, and the programmable path-selection circuit 140 routes the first packet to the encryption circuit 306 to be encrypted and routes the encrypted packet to the first port 302. The programmable path-selection circuit 140 routes the first packet in a first path 301 between the second port 304 and the first port 302 through the encryption circuit 306. In the first mode, the first port 302 receives a second packet, and the programmable path-selection circuit 140 routes the second packet to the decryption circuit 308 to be decrypted. The programmable path-selection circuit 140 routes the decrypted packet to the second port 304. The programmable path-selection circuit 140 routes the second packet in a second path 303 between the first port 302 and the second port 304 through the decryption circuit 308. For simplicity, FIG. 3A does not show a network processing element that processes the incoming and outgoing packets.

Figure 3B:
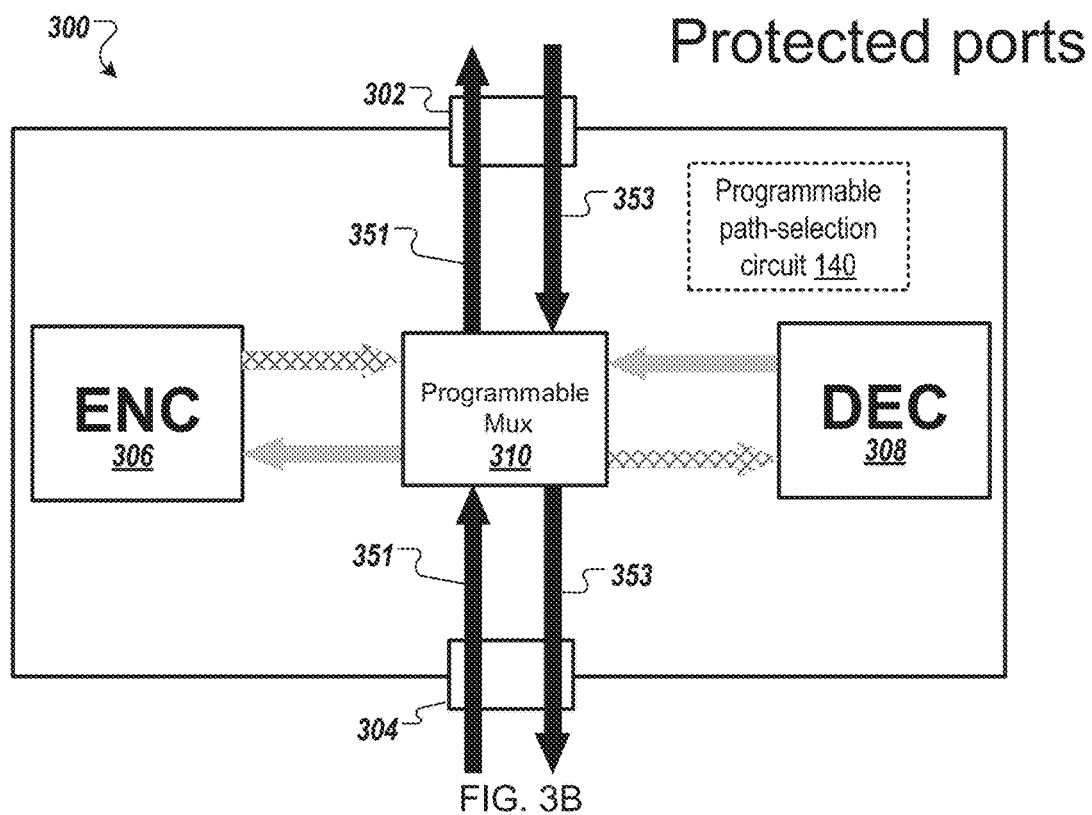
FIG. 3B is a block diagram of a network device with paths to an encryption circuit and a decryption circuit in a second mode using a programmable multiplexer, in accordance with at least some embodiments.

FIG. 3B is a block diagram of a network device 300 with paths to an encryption circuit and a decryption circuit in a second mode using a programmable multiplexer, in accordance with at least some embodiments. The programmable path-selection circuit 140 provides paths between the first port 302 and the second port 304 and through the encryption circuit 306 and decryption circuit 308 in a second mode. In the second mode, the second port 304 receives a first packet, and the programmable path-selection circuit 140 routes the first packet to either the encryption circuit 306 or the decryption circuit 308 using a programmable multiplexer 310 and routes the encrypted or decrypted packet to the first port 302 using the programmable multiplexer 310. The programmable path-selection circuit 140 routes the first packet in a first path 351 between the second port 304 and the first port 302 through either the encryption circuit 306 or the decryption circuit 308. In the second mode, the first port 302 receives a second packet, and the programmable path-selection circuit 140 routes the second packet to either the encryption circuit 306 or the decryption circuit 308 using the programmable multiplexer 310 and routes the encrypted or decrypted packet to the second port 304 using the programmable multiplexer 310. The programmable path-selection circuit 140 routes the second packet in a second path 303 between the first port 302 and the second port 304 through either the encryption circuit 306 or the decryption circuit 308. For simplicity, FIG. 3B does not show a network processing element that processes the incoming and outgoing packets.

In at least one embodiment, in the first mode, the programmable path-selection circuit 140 using the programmable multiplexer 310 can route a first outgoing packet to a cryptographic circuit, such as a security IC (e.g., a MACsec device or an IPsec device), to obtain an encrypted packet and send the encrypted packet on an outgoing protected port. The programmable path-selection circuit 140 using the programmable multiplexer 310 can receive a first incoming packet on an incoming protected port, route the first incoming packet to the security IC to obtain a decrypted packet, and route the decrypted packet to the network processing element.

In at least one embodiment, in the second mode, the programmable path-selection circuit 140 using the programmable multiplexer 310 can receive a first incoming packet on an incoming port. To obtain an encrypted packet, the programmable multiplexer 310 routes the first incoming packet to a cryptographic circuit, such as a security IC (e.g., a MACsec device or an IPsec device). The programmable multiplexer 310 routes the encrypted packet to the network processing element to obtain an encapsulated packet. The encapsulated packet can include overlay information in addition to the encrypted packet. The programmable multiplexer 310 routes the encapsulated packet on an outgoing protected port. In another embodiment, in the second mode, the programmable path-selection circuit 140 can route a first outgoing packet to the security integrated circuit to obtain a decrypted packet and send the decrypted packet on an outgoing port.

In at least one embodiment, an operator can choose which paths 351 and 353 packets should take to the encryption circuit 306 and the decryption circuit 308. For the second mode, the incoming packets from "unprotected" ports can be routed to the encryption circuit 306, while the incoming packets from protected ports can be routed out with or without being routed to the encryption circuit 306 or the decryption circuit 308. The outgoing packets to the "unprotected" ports can be routed to the decryption circuit 308, while the outgoing packets from protected ports can be routed out with or without being routed to the encryption circuit 306 or the decryption circuit 308.

Figure 4:
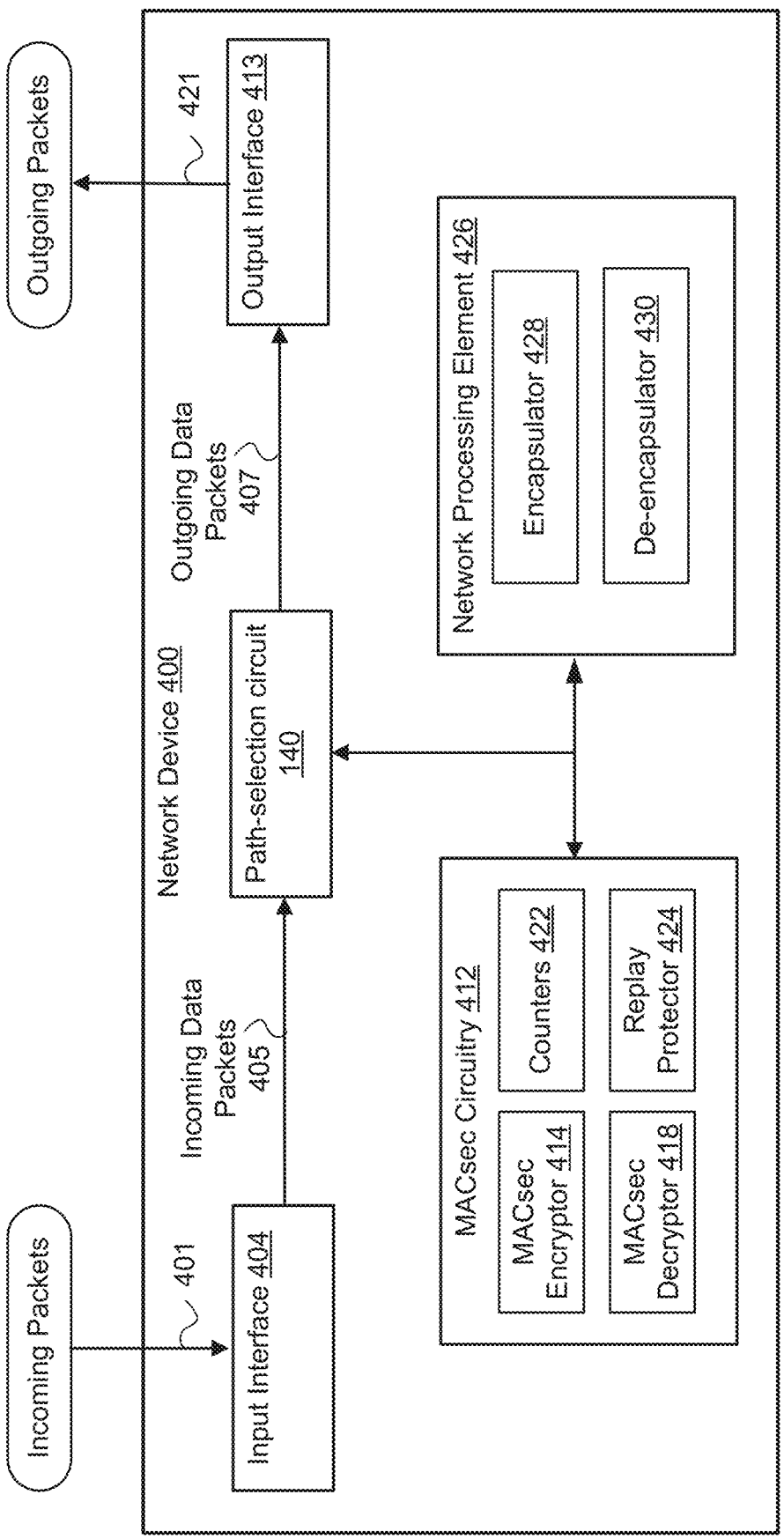
FIG. 4 is a block diagram of a network device, in accordance with at least some embodiments.

FIG. 4 is a block diagram of a network device 400 with path-selection circuit 140, in accordance with at least some embodiments. In at least some embodiments, the network device 400 includes an input interface 404, MACsec circuitry 412, network processing element 426, and an output interface 413. The input interface 404 can be coupled to an incoming network link 401, over which the network device 400 receives network packets. The input interface 404 is further coupled to the path-selection circuit 140. The path-selection circuit 140 can be coupled to at least two different paths to which the path-selection circuit 140 can route the incoming data packets 405 to the MACsec circuitry 412, the network processing element 426, or both. Once the packets are processed, the path-selection circuit 140 can transmit the outgoing data packets 407 to the output interface 413, e.g., over an outgoing network link 421 to a destination network device.

More specifically, in at least some embodiments, the path-selection circuit 140 is coupled between the input interface 404 and the output interface 413 to route the incoming data packets 405 to the MACsec circuitry 412 before or after processing by the network processing element 426 depending on a mode of the network device 400.

In at least one embodiment, the MACsec circuitry 412 can perform authentication, integrity checks, and optional encryption or decryption on the incoming data packets 405 or the outgoing data packets 407, as described herein. In at least some embodiments, the MACsec circuitry 412 includes a MACsec encryptor 414, a MACsec decryptor 418, a set of counters 422, and a replay protector 424, all of which can be hardware. In one embodiment, the MACsec encryptor 414 and the MACsec decryptor 418 are combined into a single encryption/decryption engine. The MACsec encryptor 414 and MACsec decryptor 418 can be employed to generate a tag for purposes of an integrity check and the replay protector 424 can add to the security tag in order to provide replay protection. The MACsec encryptor 414 can optionally encrypt a packet before sending a secure packet to the output interface 413 or before sending the secure packet to the network processing element 426 as described herein. If a packet is already encrypted, the MACsec decryptor 418 can decrypt the secure packet to generate an unencrypted packet before sending the unencrypted packet to the output interface 413 or before sending the secure packet to the network processing element 426 as described herein. As discussed previously, the encryption or decryption is optional. Thus, the MACsec circuitry 412 can encrypt or decrypt the packet to provide point-to-point encryption between the first network circuit and the second network circuit of the packet. The MACsec circuitry 412 can include additional components and functionality, but is illustrated in a simplistic form for purposes of explanation.

In at least one embodiment, the network processing element 426 can perform encapsulation of a packet. In at least some embodiments, the network processing element 426 includes an encapsulator 428 and a de-encapsulator 430, both of which can be hardware.

In one embodiment, the encapsulator 428 and the de-encapsulator 430 are combined into a single encapsulation engine. The encapsulator 428 and the de-encapsulator 430 can be employed to encapsulate a packet with overlay or underlay information or extract overlay or underlay information from a packet. The encapsulator 428 can optionally encapsulate a packet before sending a secure packet to the output interface 413 as described herein.

Figure 5:
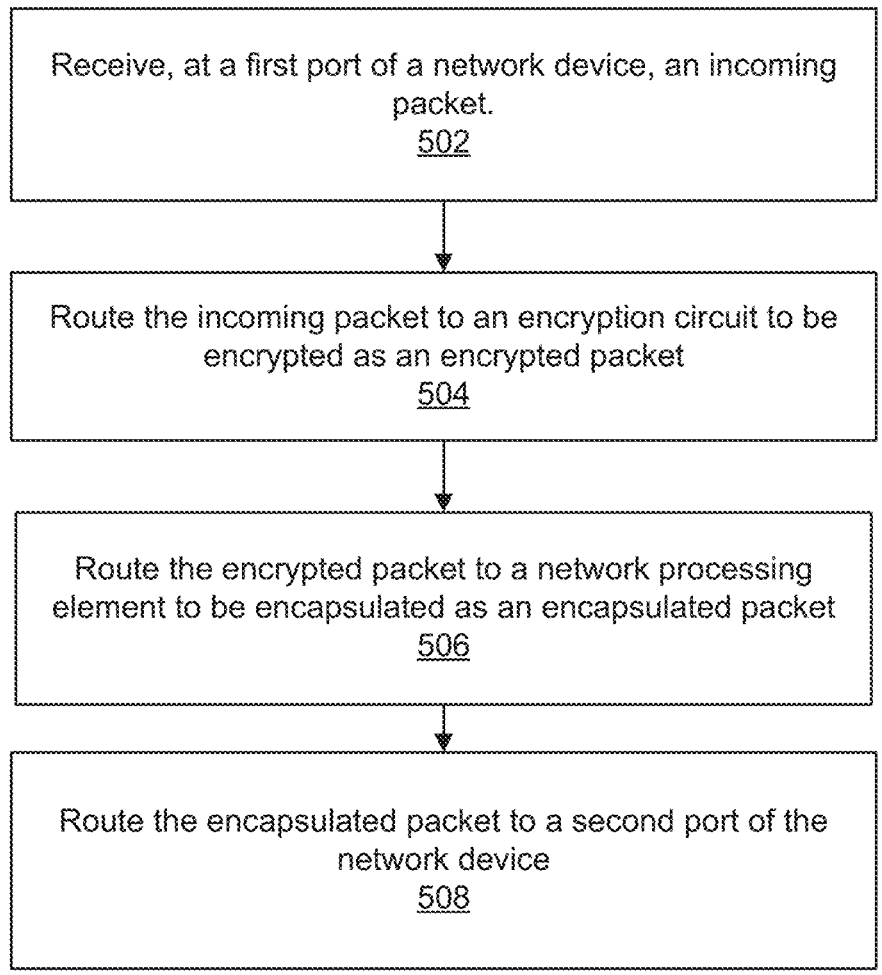
FIG. 5 is a flow diagram of a method for routing incoming packets to be encrypted and encapsulated in a network device, in accordance with at least some embodiments.

FIG. 5 is a flow diagram of a method 500 for routing incoming packets to be encrypted and encapsulated in a network device, in accordance with at least some embodiments. The method 500 can be performed by processing logic comprising hardware, software, firmware, or any combination thereof. In at least one embodiment, the method 500 is performed by any one of device 110 or device 112 of FIG. 1 or the network device 150 of FIG. 1B. In at least one embodiment, the method 500 is performed by any one of the network devices 200 of FIG. 2, 300 of FIG. 3, and 400 of FIG. 4.

Referring to FIG. 5, the method 500 begins by the processing logic receives, at a first port of a network device, an incoming packet (block 502). The processing logic routes the incoming packet to an encryption circuit to be encrypted as an encrypted packet (block 504). The processing logic routes the encrypted packet to a network processing element to be encapsulated as an encapsulated packet (block 506). The processing logic routes the encapsulated packet to a second port of the network device (block 508).

In a further embodiment, the processing logic receiving an outgoing packet from the network processing element. The processing logic routes the outgoing packet to a decryption circuit to be decrypted as a decrypted packet. The processing logic routes the decrypted packet to the second port.

In a further embodiment, the processing logic receives a second incoming packet at the first port. The processing logic routes the second incoming packet to a decryption circuit to be decrypted as a second decrypted packet. The processing logic routes the second decrypted packet to the network processing element.

In a further embodiment, the processing logic receives a second outgoing packet from the network processing element. The processing logic routes the second outgoing packet to the encryption circuit to be encrypted as a second encrypted packet. The processing logic routes the second encrypted packet to the second port.

In a further embodiment, the processing logic receives a second incoming packet at a third port of the network device. In at least one embodiment, the third port is a protected port. The processing logic routes the second incoming packet to the network processing element to be encapsulated as a second encapsulated packet. The processing logic routes the second encapsulated packet to a fourth port of the network device. In at least one embodiment, the fourth port is a protected port.

Figure 6:
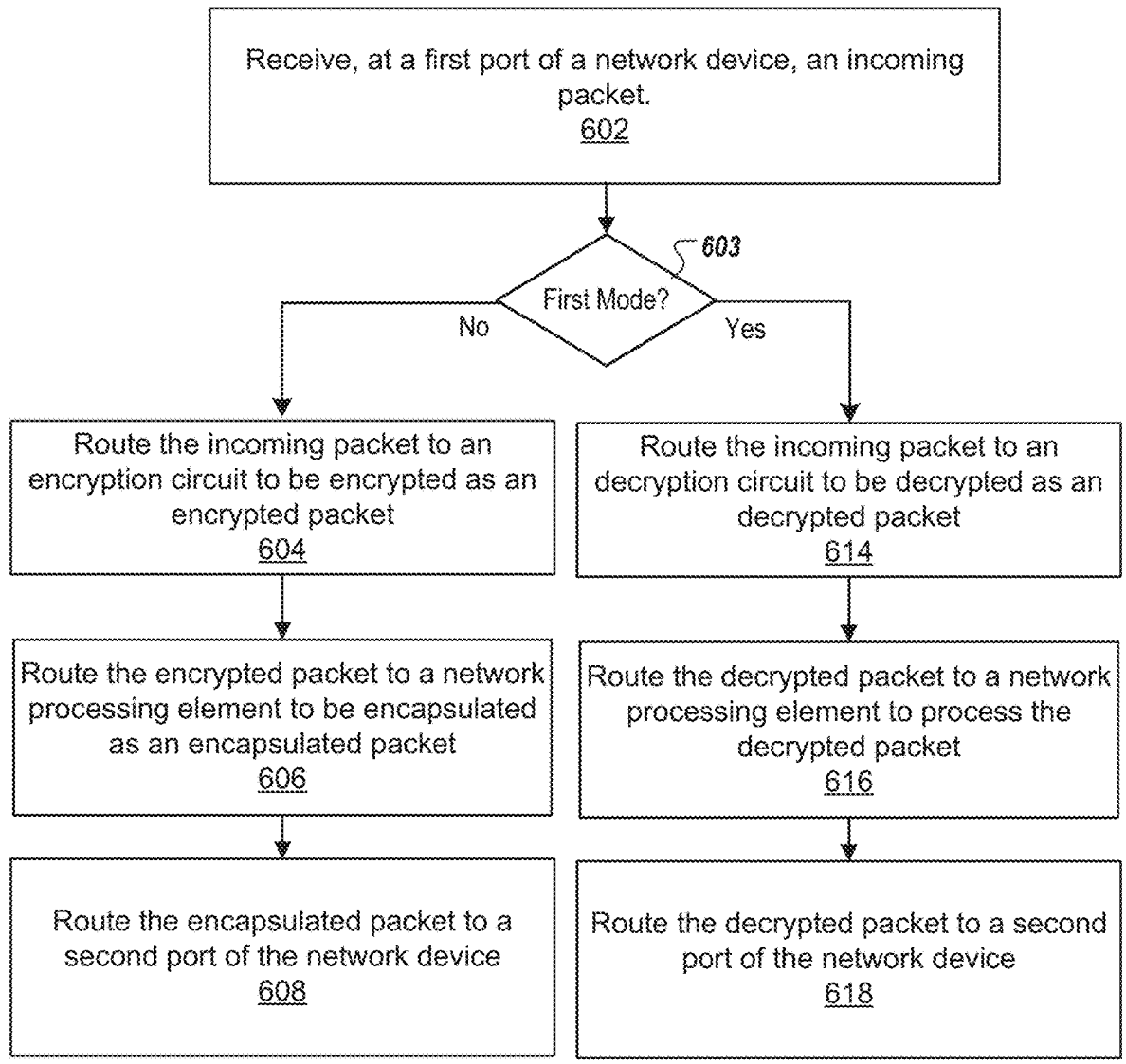
FIG. 6 is a flow diagram of a method for operating a network device in a first mode or a second mode for routing incoming packets in a network device, in accordance with at least some embodiments.

FIG. 6 is a flow diagram of a method 600 for operating a network device in a first mode or a second mode for routing incoming packets in a network device, in accordance with at least some embodiments. The method 600 can be performed by processing logic comprising hardware, software, firmware, or any combination thereof. In at least one embodiment, the method 600 is performed by any one of device 110 or device 112 of FIG. 1 or the network device 150 of FIG. 1B. In at least one embodiment, the method 600 is performed by any one of the network devices 200 of FIG. 2, 300 of FIG. 3, and 400 of FIG. 4.

Referring to FIG. 6, the method 600 begins by the processing logic receives, at a first port of a network device, an incoming packet (block 602). The processing logic determines whether the network device is operating in a first mode (block 603). If the processing logic determines that the network device is operating in the first mode at block 603, the processing logic routes the incoming packet to a decryption circuit to be decrypted as a decrypted packet (block 614). The processing logic routes the decrypted packet to the network processing element for processing (block 616). The network processing element can process overlay or underlay information contained in the packet. The processing logic routes the decrypted packet to a second port of the network device (block 618).

If the processing logic determines that the network device is not operating in the first mode at block 603, the processing logic routes the incoming packet to an encryption circuit to be encrypted as an encrypted packet (block 604). The processing logic routes the encrypted packet to a network processing element to be encapsulated as an encapsulated packet (block 606). The processing logic routes the encapsulated packet to a second port of the network device (block 608).

In another embodiment in the first mode, the processing logic receives a decrypted packet on the second port of the network device. The processing logic routes the decrypted packet to the network processing element to process the decrypted packet. The processing logic routes the decrypted packet to an encryption circuit to encrypt the decrypted packet as an encrypted packet. The processing logic routes the encrypted packet to the first port. In another embodiment in a second mode (i.e., not in the first mode), the processing logic receives an encapsulated packet on a second port of the network device. The processing logic routes the encapsulated packet to the network processing element to process the packet. The processing logic routes the processed packet to an encryption circuit to be encrypted as an encrypted packet and routes the encrypted packet to the first port.

Figure 7:
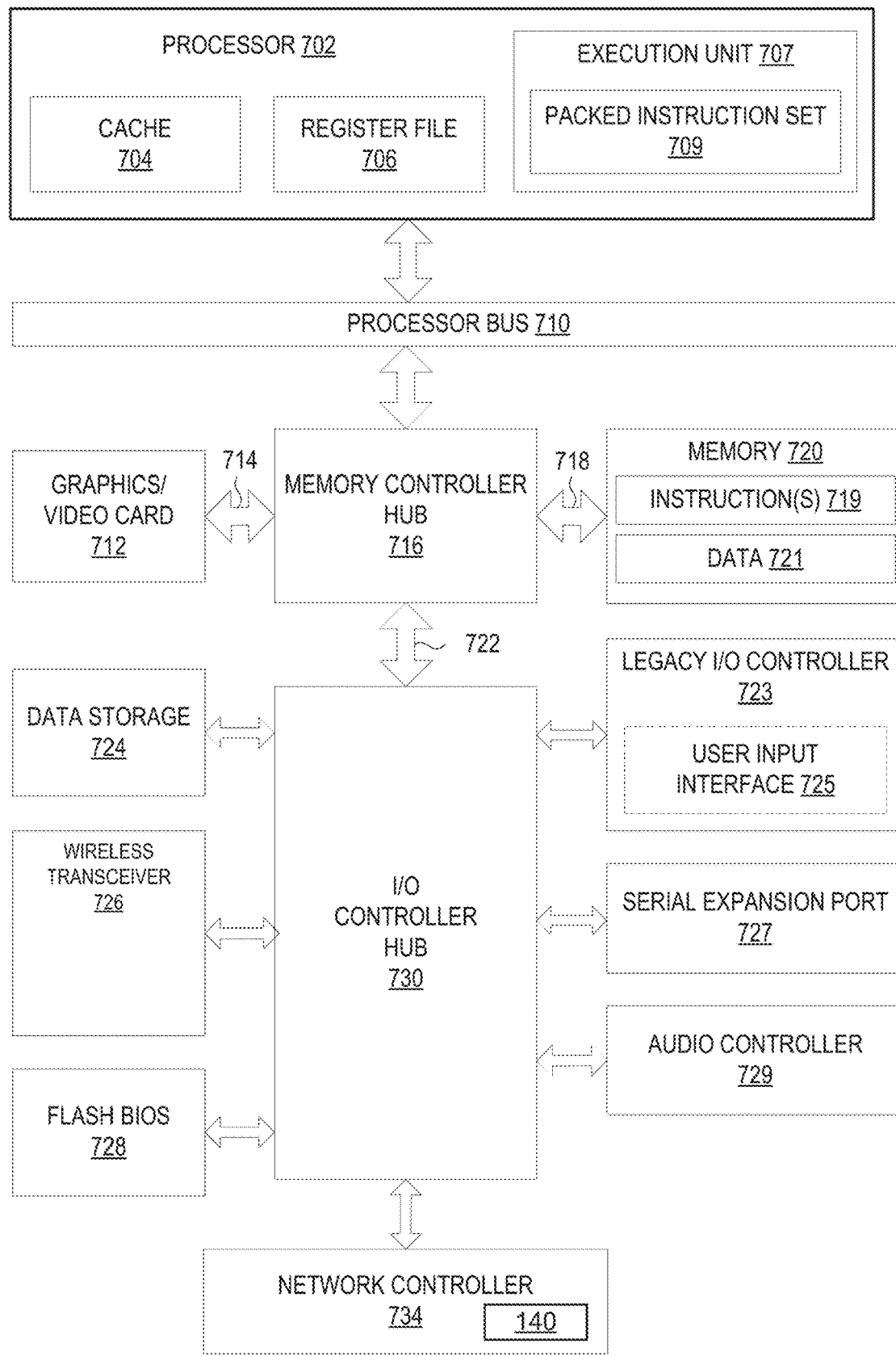
FIG. 7 illustrates an example computer system including a programmable path-selection circuit, in accordance with at least some embodiments.

FIG. 7 illustrates a computer system 700 including the programmable path-selection circuit 140, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as a processor 702 to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux, for example), embedded software, and/or graphical user interfaces, may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units, and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 707 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory devices. Memory 720 may store instruction(s) 719 and/or data 721 represented by data signals that may be executed by processor 702.

In at least one embodiment, a system logic chip may be coupled to a processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data, and textures. In at least one embodiment, MCH 716 may direct data signals between processor 702, memory 720, and other components in computer system 700 and may bridge data signals between processor bus 710, memory 720, and a system I/O 722. In at least one embodiment, a system logic chip may provide a graphics port for coupling to a graphics controller. In at least one embodiment, MCH 716 may be coupled to memory 720 through high bandwidth memory path 718, and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a wireless transceiver 726, a data storage 724, a legacy I/O controller 723 containing a user input interface 725 and a keyboard interface, a serial expansion port 727, such as a USB, and a network controller 734. In at least one embodiment, the network controller 734 includes the programmable path-selection circuit 140 as described herein. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips." In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof. In at least one embodiment, one or more components of system 700 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network device comprising:
a plurality of ports;
a network processing element, wherein the network processing element is to encapsulate a packet to obtain an encapsulated packet;
a programmable path-selection circuit coupled to the plurality of ports and the network processing element; and
a security integrated circuit coupled to the programmable path-selection circuit, wherein the programmable path-selection circuit is to operate in a first mode and a second mode, wherein:
i) in the first mode, first outgoing packets are routed to the security integrated circuit to be encrypted before sending on one of the plurality of ports, and first incoming packets, received on one of the plurality of ports, are routed to the security integrated circuit to be decrypted; and
ii) in the second mode, second incoming packets are routed to the security integrated circuit to be encrypted before processing by the network processing element.

2. The network device of claim 1, wherein, in the second mode, the programmable path-selection circuit is to route second outgoing packets to the security integrated circuit to be decrypted after processing by the network processing element.

3. The network device of claim 1, wherein, in the first mode, the programmable path-selection circuit is to:
route a first outgoing packet to the security integrated circuit to obtain an encrypted packet;
send the encrypted packet on a first port of the plurality of ports, wherein the first port is a protected port;
receive a first incoming packet on a second port of the plurality of ports, wherein the second port is a protected port;
route the first incoming packet to the security integrated circuit to obtain a decrypted packet; and
route the decrypted packet to the network processing element.

4. The network device of claim 1, wherein, in the second mode, the programmable path-selection circuit is to:
receive a first incoming packet on a first port of the plurality of ports;
route the first incoming packet to the security integrated circuit to obtain an encrypted packet; and
route the encrypted packet to the network processing element to obtain an encapsulated packet, wherein the encapsulated packet is sent on a second port of the plurality of ports, wherein the second port is a protected port.

5. The network device of claim 4, wherein, in the second mode, the programmable path-selection circuit is to:
route a first outgoing packet to the security integrated circuit to obtain a decrypted packet; and
send the decrypted packet to a second port of the plurality of ports.

6. The network device of claim 5, wherein the second port is a non-protected port.

7. The network device of claim 1, wherein the security integrated circuit is a media access control security (MACsec) device.

8. The network device of claim 1, wherein the security integrated circuit is an Internet Protocol security (IPsec) device.

9. An apparatus comprising:
a first port;
a second port;
a third port;
a fourth port;
a path-selection circuit coupled to the first port, the second port, the third port, and the fourth port;
a decryption circuit coupled to the path-selection circuit;
an encryption circuit coupled to the path-selection circuit; and
a network processing element coupled to the path-selection circuit, wherein the network processing element is to encapsulate a packet to obtain an encapsulated packet, and wherein the path-selection circuit is to:
in a first mode, route first incoming packets, received on the first port, to the decryption circuit to decrypt the first incoming packets before routing to the network processing element to obtain first outgoing packets;
in the first mode, route the first outgoing packets to the encryption circuit to encrypt the first outgoing packets before sending on the second port; and
in a second mode, route second incoming packets, received on the third port, to the encryption circuit to encrypt the second incoming packets before routing to the network processing element.

10. The apparatus of claim 9, wherein the network processing element is to receive the second incoming packets and generate second outgoing packets, wherein the path-selection circuit is to route the second outgoing packets to the decryption circuit to decrypt the second outgoing packets before sending to the fourth port, wherein the second outgoing packets received at the decryption circuit are encapsulated packets.

11. The apparatus of claim 10, further comprising a media access control security (MACsec) device comprising the encryption circuit and the decryption circuit.

12. The apparatus of claim 10, further comprising an Internet Protocol security (IPsec) device comprising the encryption circuit and the decryption circuit.

13. The apparatus of claim 10, wherein the path-selection circuit is to:
route the first outgoing packets to the encryption circuit in the first mode; and
route the second outgoing packets to the decryption circuit in the second mode.

14. The apparatus of claim 10, wherein the encapsulated packets comprises overlay information.

15. A method comprising:
receiving, at a first port of a network device, a first incoming packet;
in a first mode, routing, using a path-selection circuit, the first incoming packet to a decryption circuit of the network device to be decrypted before routing to a network processing element to obtain a first outgoing packet, wherein the network processing element is to encapsulate a packet to obtain an encapsulated packet;
in the first mode, routing, using the path-selection circuit, the first outgoing packet to an encryption circuit of the network device to encrypt the first outgoing packet before sending to a second port of the network device;
receiving, at a third port of the network device, a second incoming packet; and
in a second mode, routing, using the path-selection circuit, the second incoming packet to the encryption circuit to encrypt the second incoming packet to obtain an encrypted packet before routing to the network processing element.

16. The method of claim 15, further comprising:
receiving an outgoing packet from the network processing element, the outgoing packet corresponding to the encrypted packet;
routing the outgoing packet to the decryption circuit to be decrypted as a decrypted packet; and
routing the decrypted packet to a fourth port of the network device.

17. The method of claim 15, further comprising:
receiving an outgoing packet from the network processing element, the outgoing packet corresponding to the encrypted packet; and
routing the outgoing packet to a fourth port of the network device.

18. The method of claim 15, further comprising:
receiving a second outgoing packet from the network processing element, the second outgoing packet corresponding to the second incoming packet;
routing the second outgoing packet to the encryption circuit to be encrypted as a second encrypted packet; and
routing the second encrypted packet to a fourth port of the network device.

19. The method of claim 15, wherein the first port is a protected port, and wherein the second port is a protected port.

* * * * *